June 18, 1968    J. K. A. DAHLGREN ET AL    3,388,914
ROTARY FACE SEAL ASSEMBLY WITH A SPRING LOCKED SHAFT PIN
Filed May 13, 1965

3,388,914
ROTARY FACE SEAL ASSEMBLY WITH A
SPRING LOCKED SHAFT PIN
Jens Karl Adolf Dahlgren, Stockholm, and Filip Torvald
Stahl, Alvsjo, Sweden, assignors to Aktiebolaget Flygts
Pumpar, Solna, Sweden, a corporation of Sweden
Filed May 13, 1965, Ser. No. 455,550
Claims priority, application Sweden, May 28, 1964,
6,525/64
4 Claims. (Cl. 277—84)

ABSTRACT OF THE DISCLOSURE

A rotary face seal for a rotating shaft is carried by a pin inserted into a blind hole in the shaft and projecting outwardly. A sleeve retains the pin and rotates with the shaft. The face seal is carried in a rotating cup and is biased into sealing contact by a spring compressed between the cup and the sleeve. The cup and sleeve are drivingly interconnected but movable axially relative to one another and the pin retaining portion of the sleeve is open in a direction away from the seal so that the seal assembly may be easily installed or dismantled by moving the sleeve to uncover the pin and then inserting or removing the pin.

---

The present invention relates to a sealing arrangement, particularly for a shaft of a hot water pump.

The object of the invention is to produce a simple and positive sealing arrangement which is easy to assemble and dismantle.

The sealing arrangement in question is arranged to rotate together with the shaft and is substantially characterized in that it is carried by at least one pin inserted in the shaft, which pin is held by a sleeve, fitted over the shaft and arranged to carry a sealing ring, which sleeve locks the pin or pins in their position.

The end of the pin is advantageously arranged to project into a recess in the lower portion of the sleeve which lower portion can be constructed in the form of a cuff which fits fairly tightly around the shaft, in which cuff a flap is bent outwards so that the outer end of the pin can abut the same. Possibly an inner sleeve can be pressed into the first mentioned sleeve which thus becomes the outer sleeve, said inner sleeve having a cut away section through which the pin projects out into abutment with the outer sleeve.

According to one embodiment of the invention the outer sleeve forms a bottom at the point where its lower section extends out into an upper widened section, against which bottom rests the one end of a spring situated in said widened portion and which has been pressed onto said shaft the other end of said spring forcing the sealing ring into abutment with the surface against which sealing is to be effected. The sealing ring can thereby conveniently rest in a cup guided in the sleeve, which cup is carried by said sleeve in the direction of the rotation of the shaft and pressed against the sealing ring by the spring.

Figure 1:
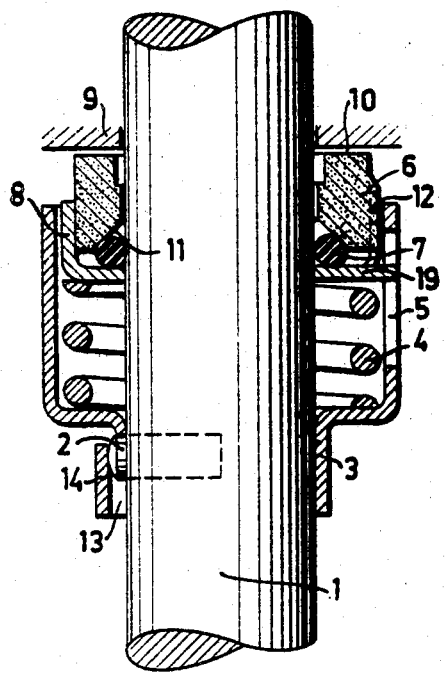
Figure 2:
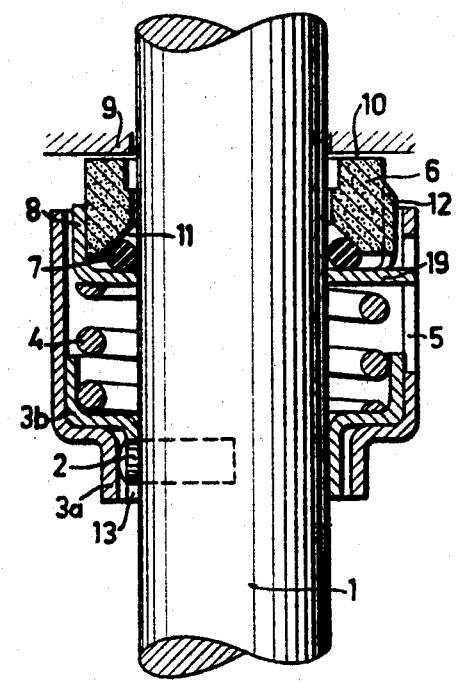

The invention will be further described in connection with the attached drawing where FIG. 1 and FIG. 2 show a first and second embodiment respectively of the sealing arrangement in section, as well as the cooperating shaft.

A shaft 1 is arranged to pass through a plane surface 9 at right angles to the same during sealing of the intermediate chamber between the shaft 1 and the surface 9.

The sealing arrangement includes a sealing ring 6, a carbon ring for example, which is fitted over the shaft and arranged to abut, with its plane upper surface 10, the plane surface 9, which is suitably of hard metal, bronze or the like. The ring 6 is chamfered at the bottom so that a seat 11 for a rubber sealing ring 7 is formed. The ring 6 is provided with a projection 12 situated in a slot in a holder cup 8 fitted over the shaft, which cup 8 supports the rings 6 and 7. The cup 8 being pressed, by a helical spring 4 fitted over the shaft, in an upwards direction in order to press the ring 7 against the ring 6 and ring 6 against the surface 9. The spring rests in a sleeve 3 fitted over the same, which sleeve is provided with a slot 5 which receives a projection 19 from the cup 8. As shown in the drawing, the projection 19 is a portion of the wall of cup 8 bent outwardly. The recess formed in the cup accommodates projection 12. The sleeve 3 which is cup shaped at the bottom forms a support or bottom for the spring 4 and is provided underneath with a recess 13 into which a pin 2, inserted into the shaft 1 from the side, is introduced so that the sleeve 3 is prevented by the pin 2 from being displaced downwards whereby a flap 14 of the sleeve abuts the outer end of the pin and thus prevents it from falling out of the shaft during rotation of the same.

It is considered that the function of the arrangement is easy. The sleeve 3 is caused to rotate together with the shaft by means of the pin 2. The cup 8 rotates, due to its projection 19, together with the sleeve 3 and the shaft 1 and this is also true for the ring 6 due to the projection 12 being in engagement with the same. The ring 7 produces a seal between the shaft 1 and the surface 11 of the ring 6, due to the fact that it is pressed upwards by the compressed spring 4, and said ring 6 provides face sealing against the surface 9, hence fluid possibly present around the shaft 1 cannot penetrate into the space existing on the upper surface of section 9.

The sealing arrangement as shown in FIG. 2 differs from that in FIG. 1 only in that the sleeve 3 is replaced by an inner sleeve 3b provided with a recess 13 and an outer sleeve 3a embracing said inner sleeve 3b, which outer sleeve 3a abuts the end of the pin 2 whereby the end of the flap 14 according to FIG. 1 is left out.

The invention is characterized by its simplicity in assembling the sealing arrangement, which is arranged so that after the shaft 1 is passed through the surface 9, the whole of the face sealing arrangement—comprising face sealing ring 6, sealing ring 7, cup 8, spring 4 and sleeve 3—is fitted over the shaft 1 and pressed upwards against the surface 9 to such an extend that the hole in the shaft 1 for the pin 2 is uncovered. The pin is thereafter inserted and the sleeve 3 is released with its outwardly pressed flap 14 fitting over the pin, whereby a mutual locking of sleeve and pin is obtained. Assembly of the face sealing arrangement, shown in FIG. 2, is effected in an analogous manner.

Although the invention is described in connection to two embodiments of the same it can, in an arbitrary fashion, be varied within the scope of the following claims.

What we claim is:

1. A face seal assembly for sealing a rotating shaft to an adjoining stationary planar surface surrounding the shaft and extending transverse thereto, the sealing assembly comprising; a rotatable seal ring positioned around the shaft with a sealing surface facing the planar surface, said seal ring having an edge opposite said sealing surface chamfered adjacent said shaft, a cup surrounding the rotatable seal ring, positive interengaging means on the seal ring and on the cup to cause the ring to rotate with the cup, a resilient sealing ring disposed within said cup and positioned between said seal ring and the shaft in contact with said chamfered edge, the sealing ring being contacted by the cup, a sleeve surrounding the shaft below the cup and having an upper section fitting over the cup and a lower section fitting over the shaft, mutual engaging members comprising slot and projection means on the sleeve and cup respectively allowing relative axial movement while positively preventing relative rotation between the sleeve and the cup, a spring between the cup and the lower section of the sleeve and surrounding the shaft, a blind bore disposed in said shaft, a pin removably inserted into said blind bore, a covered recess in the lower section of the sleeve, said pin projecting into said covered recess to cause the sleeve to rotate with the shaft and to hold the spring in compressed condition, the recess closed in the direction of the seal ring to provide a stop for the sleeve biased against the pin by the spring and the recess open in the direction away from the seal ring to allow assembly and disassembly by compressing the spring to slide the sleeve axially toward the seal and uncover the pin.

2. A face seal assembly as in claim 1 wherein the recess is formed by an outwardly bent flap of the sleeve.

3. A face seal assembly as in claim 1 wherein the lower part of the sleeve is formed by two concentric sleeves, the inner concentric sleeve having a slot to accommodate the pin and provide the recess and the outer concentric sleeve abutting the end of the pin to provide the outer cover for the recess.

4. A face seal assembly as defined in claim 1 wherein the mutual engaging members on the sleeve and cup include a projection formed by a portion of an upstanding wall of the cup extending laterally outward engageable with an axial slit in the sleeve, the removed portion of the upstanding wall of the cup forming a recess to accommodate a projection on the seal ring which constitutes the engaging means between the ring and the cup.

References Cited

UNITED STATES PATENTS 2,257,349   9/1941   Sherwood _____ 277—87 X
2,362,854   11/1944   Stephens _____ 277—91
2,760,794   8/1956   Hartranft _____ 277—87

FOREIGN PATENTS 643,997   7/1962   Canada.

LAVERNE D. GEIGER, *Primary Examiner.*

J. S. MEDNICK, *Assistant Examiner.*